United States Patent
Sherman et al.

(10) Patent No.: US 7,634,256 B2
(45) Date of Patent: *Dec. 15, 2009

(54) CALLER IDENTIFICATION QUEUE FOR WIRELESS TELEPHONES

(75) Inventors: Stephen Sherman, Alpharetta, GA (US); Corey Feldstein, Powder Springs, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/473,530

(22) Filed: Jun. 23, 2006

(65) Prior Publication Data

US 2007/0072596 A1    Mar. 29, 2007

(51) Int. Cl.
*H04M 3/42*    (2006.01)
(52) U.S. Cl. .................. 455/415; 455/412.2; 455/421
(58) Field of Classification Search ............. 455/415, 455/421
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | 370/338 |
| 4,277,649 A | 7/1981 | Sheinbein | |
| 4,582,956 A | 4/1986 | Doughty | |
| 4,649,533 A | 3/1987 | Chorley et al. | |
| 4,663,777 A | 5/1987 | Szeto | |
| 4,698,839 A | 10/1987 | DeVaney et al. | 455/560 |
| 4,791,664 A | 12/1988 | Lutz et al. | |
| 4,797,911 A | 1/1989 | Szlam et al. | |
| 4,802,202 A | 1/1989 | Takahashi et al. | |
| 4,817,133 A | 3/1989 | Takahashi et al. | |
| 4,823,304 A | 4/1989 | Frantz et al. | |
| 4,845,743 A | 7/1989 | Lutz | |

(Continued)

FOREIGN PATENT DOCUMENTS

EP    0 821 511 A2    1/1998

(Continued)

OTHER PUBLICATIONS

"RBS 884 Pico System Description," Author Unknown, Ericsson 1/1551-AE/LZB 119 2269 Uae Rev A, Apr. 23, 1998.

(Continued)

*Primary Examiner*—Simon Sing
(74) *Attorney, Agent, or Firm*—Cantor Colburn LLP

(57) ABSTRACT

A method and system are provided for collecting and storing caller identification information associated with a calling party directed to an out of service wireless telephone. When calls are made to a wireless telephone, a determination is made as to whether the telephone is registered for service, that is, whether the telephone can receive calls because it is powered on and is located within a wireless telecommunications service area where it may receive calls. During out of service periods, caller identification information on calls placed to the wireless telephone is stored in an identification queue. Once the wireless telephone is registered for service, stored caller identification information is forwarded to the wireless telephone for presentation to the user of the wireless telephone. Accordingly, the user of the wireless telephone avoids missing telephone calls made to her wireless telephone during the out of service period, and the user may then return the telephone calls at a convenient time.

20 Claims, 3 Drawing Sheets

U.S. PATENT DOCUMENTS

| | | | |
|---|---|---|---|
| 4,850,013 A | 7/1989 | Rose | |
| 4,850,103 A | 7/1989 | Takemoto et al. | |
| 4,955,075 A | 9/1990 | Anderson | |
| 4,995,075 A | 2/1991 | Angiolillo-Bent | |
| 5,029,196 A | 7/1991 | Morganstein | |
| 5,109,405 A | 4/1992 | Morganstein | |
| 5,121,423 A | 6/1992 | Morihiro et al. | |
| 5,151,929 A | 9/1992 | Wolf | |
| 5,157,712 A | 10/1992 | Wallen, Jr. | |
| 5,161,181 A | 11/1992 | Zwick | |
| 5,200,994 A | 4/1993 | Sasano et al. | 379/142.06 |
| 5,206,901 A | 4/1993 | Harlow | |
| D338,889 S | 8/1993 | Fuqua | |
| 5,260,987 A | 11/1993 | Mauger | 455/560 |
| 5,263,084 A | 11/1993 | Chaput et al. | |
| 5,265,145 A | 11/1993 | Lim | |
| 5,274,699 A | 12/1993 | Ranz | |
| 5,278,894 A | 1/1994 | Shaw | 379/88.19 |
| 5,289,542 A | 2/1994 | Kessler | |
| 5,315,650 A | 5/1994 | Smith et al. | |
| 5,333,152 A | 7/1994 | Wilber | 379/102.04 |
| 5,338,889 A | 8/1994 | Vora et al. | |
| 5,341,411 A | 8/1994 | Hashimoto | |
| 5,347,574 A | 9/1994 | Morganstein | |
| 5,361,295 A | 11/1994 | Solomon et al. | |
| 5,383,466 A | 1/1995 | Partika | |
| 5,386,460 A | 1/1995 | Boakes et al. | |
| 5,388,150 A | 2/1995 | Schneyer et al. | |
| 5,413,605 A | 5/1995 | Ashby et al. | |
| 5,420,910 A | 5/1995 | Rudokas et al. | 379/59 |
| 5,420,914 A | 5/1995 | Blumhardt | |
| 5,420,920 A | 5/1995 | Capper et al. | |
| 5,425,076 A | 6/1995 | Knippelmier | 379/27.04 |
| 5,425,089 A | 6/1995 | Chan et al. | |
| 5,430,719 A | 7/1995 | Weisser, Jr. | |
| 5,446,785 A | 8/1995 | Hirai | |
| 5,452,346 A | 9/1995 | Miyamoto | |
| 5,459,779 A | 10/1995 | Backaus et al. | |
| 5,466,785 A | 11/1995 | De Framond | |
| 5,467,388 A | 11/1995 | Redd, Jr. et al. | |
| 5,475,748 A | 12/1995 | Jones | |
| 5,481,594 A | 1/1996 | Shen | 379/88.19 |
| 5,481,599 A | 1/1996 | MacAllister et al. | |
| 5,481,602 A | 1/1996 | Griffiths et al. | |
| 5,490,205 A | 2/1996 | Kondo et al. | |
| 5,497,414 A | 3/1996 | Bartholomew | |
| 5,502,762 A | 3/1996 | Andrew | |
| 5,506,893 A | 4/1996 | Buscher et al. | |
| 5,511,111 A | 4/1996 | Serbetcioglu et al. | |
| 5,530,741 A | 6/1996 | Rubin | |
| 5,533,106 A | 7/1996 | Blumhardt | |
| 5,535,265 A | 7/1996 | Suwandhaputra | |
| 5,537,470 A | 7/1996 | Lee | |
| 5,539,809 A | 7/1996 | Mayer | |
| 5,546,447 A | 8/1996 | Skarbo et al. | 379/142.05 |
| 5,550,900 A | 8/1996 | Ensor et al. | |
| 5,550,905 A | 8/1996 | Silverman | |
| 5,563,935 A | 10/1996 | Small | |
| 5,563,936 A | 10/1996 | Washington | |
| 5,602,908 A | 2/1997 | Fan | |
| 5,608,788 A | 3/1997 | Demlow et al. | |
| 5,619,561 A | 4/1997 | Resse | |
| 5,631,950 A | 5/1997 | Brown | |
| 5,636,269 A | 6/1997 | Eisdorfer | |
| 5,644,629 A | 7/1997 | Chow | |
| 5,646,979 A | 7/1997 | Knuth | |
| 5,657,372 A | 8/1997 | Ahlberg et al. | 455/414.1 |
| D383,466 S | 9/1997 | Burrell et al. | |
| 5,668,852 A | 9/1997 | Holmes | 405/31.2 |
| 5,696,809 A | 12/1997 | Voit | |
| 5,696,815 A | 12/1997 | Smyk | |
| 5,699,523 A | 12/1997 | Li et al. | |
| 5,701,301 A | 12/1997 | Weisser, Jr. | |
| 5,703,934 A | 12/1997 | Zicker et al. | |
| 5,703,943 A | 12/1997 | Otto | |
| 5,724,412 A | 3/1998 | Srinivasan | 379/93.23 |
| 5,734,706 A | 3/1998 | Windsor et al. | |
| 5,742,668 A | 4/1998 | Pepe et al. | |
| 5,742,905 A | 4/1998 | Pepe et al. | |
| 5,754,635 A | 5/1998 | Kim | |
| 5,754,636 A | 5/1998 | Bayless et al. | |
| 5,754,775 A | 5/1998 | Adamson et al. | |
| 5,771,281 A | 6/1998 | Batten, Jr. | |
| 5,771,283 A | 6/1998 | Chang et al. | |
| 5,781,621 A | 7/1998 | Lim et al. | |
| 5,784,444 A | 7/1998 | Snyder et al. | |
| 5,796,806 A | 8/1998 | Birckbirchler | |
| 5,799,072 A | 8/1998 | Vulcan | |
| 5,802,160 A | 9/1998 | Kugell | |
| 5,802,251 A | 9/1998 | Cohen et al. | |
| 5,805,587 A | 9/1998 | Norris et al. | 370/352 |
| 5,805,682 A | 9/1998 | Voit et al. | |
| 5,805,997 A | 9/1998 | Farris | |
| 5,809,128 A | 9/1998 | McMullin | |
| 5,812,533 A | 9/1998 | Cox et al. | |
| 5,812,649 A | 9/1998 | Shen | 379/142.14 |
| 5,838,774 A | 11/1998 | Weisser, Jr. | |
| 5,841,838 A | 11/1998 | Itoh et al. | |
| 5,841,850 A | 11/1998 | Fan | |
| 5,848,142 A | 12/1998 | Yaker | |
| 5,850,435 A | 12/1998 | Devillier | |
| 5,850,436 A | 12/1998 | Rosen et al. | |
| 5,857,017 A | 1/1999 | Ohi | |
| 5,859,903 A | 1/1999 | Lee | |
| 5,872,834 A | 2/1999 | Teitelbaum | |
| 5,872,934 A | 2/1999 | Whitehouse et al. | |
| 5,878,036 A | 3/1999 | Spartz et al. | 370/335 |
| 5,883,942 A | 3/1999 | Lim et al. | |
| 5,884,144 A | 3/1999 | Chavz et al. | 340/7.1 |
| 5,894,504 A | 4/1999 | Alfred et al. | |
| 5,901,209 A | 5/1999 | Tannenbaum et al. | |
| 5,901,212 A | 5/1999 | True et al. | |
| 5,903,636 A | 5/1999 | Malik | |
| 5,905,794 A | 5/1999 | Gunn et al. | |
| 5,907,596 A | 5/1999 | Karnowski | |
| 5,907,604 A | 5/1999 | Hsu | |
| 5,915,000 A | 6/1999 | Nguyen et al. | |
| 5,917,817 A | 6/1999 | Dunn et al. | |
| 5,918,213 A | 6/1999 | Bernard et al. | |
| 5,923,744 A | 7/1999 | Cheng | |
| 5,930,701 A | 7/1999 | Skog | |
| 5,940,484 A | 8/1999 | DeFazio et al. | |
| 5,946,363 A | 8/1999 | Rominger et al. | |
| 5,946,636 A | 8/1999 | Uyeno et al. | |
| 5,946,684 A | 8/1999 | Lund | |
| D413,605 S | 9/1999 | Thomas | |
| 5,948,040 A | 9/1999 | DeLorme et al. | |
| 5,948,061 A | 9/1999 | Merriman et al. | |
| 5,949,865 A | 9/1999 | Fusinato | |
| 5,953,399 A | 9/1999 | Farris et al. | |
| 5,953,657 A | 9/1999 | Ghisler | |
| 5,963,626 A | 10/1999 | Nabkel | |
| 5,969,647 A | 10/1999 | Mou et al. | |
| 5,970,127 A | 10/1999 | Smith et al. | |
| 5,970,128 A | 10/1999 | Kim | |
| 5,974,309 A | 10/1999 | Foti | |
| 5,982,866 A | 11/1999 | Kowalski | |
| 5,991,377 A | 11/1999 | Malik | |
| 5,999,207 A | 12/1999 | Rodriguez et al. | |
| 5,999,599 A | 12/1999 | Shaffer et al. | |
| 5,999,613 A | 12/1999 | Nabkel et al. | |
| 6,006,087 A | 12/1999 | Amin | |
| 6,009,321 A | 12/1999 | Wang et al. | |
| 6,014,559 A | 1/2000 | Amin | |

| | | | |
|---|---|---|---|
| 6,016,512 A | 1/2000 | Huitema | |
| 6,021,188 A | 2/2000 | Meg | |
| 6,021,427 A | 2/2000 | Spagna et al. | |
| 6,031,899 A | 2/2000 | Wu | |
| 6,044,148 A | 3/2000 | Bleile | |
| 6,049,291 A | 4/2000 | Kikinis | |
| 6,058,171 A | 5/2000 | Hoopes | |
| 6,061,434 A | 5/2000 | Corbett | |
| 6,061,566 A | 5/2000 | Friman | 455/445 |
| 6,064,876 A | 5/2000 | Ishida | 455/412.1 |
| 6,065,844 A | 5/2000 | Chen | |
| 6,072,859 A | 6/2000 | Kong | |
| 6,078,581 A | 6/2000 | Shtivelman et al. | |
| 6,091,947 A | 7/2000 | Sumner | |
| 6,094,478 A | 7/2000 | Shepherd et al. | |
| 6,094,573 A | 7/2000 | Heinonen et al. | 455/412.1 |
| 6,094,574 A | 7/2000 | Vance et al. | 455/415 |
| 6,094,575 A | 7/2000 | Anderson et al. | |
| 6,101,246 A | 8/2000 | Heinmiller et al. | |
| 6,104,784 A | 8/2000 | Robbins | |
| 6,104,800 A | 8/2000 | Benson | |
| 6,108,630 A | 8/2000 | Kuechler et al. | |
| 6,111,939 A | 8/2000 | Brabanec | |
| 6,134,235 A | 10/2000 | Goldman et al. | 370/352 |
| 6,134,311 A | 10/2000 | Ekstrom | |
| 6,137,870 A | 10/2000 | Scherer | 379/127.06 |
| 6,137,871 A | 10/2000 | Maier | |
| 6,141,341 A | 10/2000 | Jones | |
| 6,141,409 A | 10/2000 | Madoch et al. | |
| 6,144,644 A | 11/2000 | Bajzath et al. | |
| 6,154,531 A | 11/2000 | Clapper | |
| 6,160,876 A | 12/2000 | Moss et al. | |
| 6,161,021 A | 12/2000 | Akpa | |
| 6,163,595 A | 12/2000 | Parker et al. | 379/22 |
| 6,163,607 A | 12/2000 | Bogart et al. | |
| 6,163,691 A | 12/2000 | Buettner et al. | |
| 6,167,254 A | 12/2000 | Chavez, Jr. et al. | |
| 6,169,911 B1 | 1/2001 | Wagner et al. | |
| 6,173,049 B1 | 1/2001 | Malik | |
| 6,178,232 B1 | 1/2001 | Latter et al. | |
| 6,181,928 B1 | 1/2001 | Moon | |
| D437,879 S | 2/2001 | Weinandt | |
| 6,185,289 B1 | 2/2001 | Hetz et al. | |
| 6,185,426 B1 | 2/2001 | Alperovich | |
| 6,192,115 B1 | 2/2001 | Toy et al. | |
| 6,192,116 B1 | 2/2001 | Mayak | 379/142.08 |
| 6,198,480 B1 | 3/2001 | Cotugno et al. | |
| 6,198,920 B1 | 3/2001 | Doviak et al. | 455/426.1 |
| 6,202,023 B1 | 3/2001 | Hancock et al. | 701/201 |
| 6,219,407 B1 | 4/2001 | Kanevsky et al. | |
| 6,222,826 B1 | 4/2001 | Faynberg et al. | |
| 6,226,367 B1 | 5/2001 | Smith et al. | |
| 6,226,369 B1 | 5/2001 | Lim et al. | 379/142.04 |
| 6,226,399 B1 | 5/2001 | Robinson | |
| 6,229,883 B1 | 5/2001 | Kakizaki et al. | |
| 6,230,006 B1 | 5/2001 | Keenan et al. | 455/424 |
| 6,233,325 B1 | 5/2001 | Frech et al. | |
| 6,236,975 B1 | 5/2001 | Boe et al. | |
| 6,243,448 B1 | 6/2001 | Corbett et al. | |
| 6,243,461 B1 | 6/2001 | Hwang | |
| 6,252,952 B1 | 6/2001 | Kung et al. | |
| 6,256,671 B1 | 7/2001 | Strentzch et al. | |
| 6,262,987 B1 | 7/2001 | Mogul | |
| 6,266,399 B1 | 7/2001 | Weller et al. | |
| 6,278,704 B1 | 8/2001 | Creamer et al. | 370/352 |
| 6,278,862 B1 | 8/2001 | Henderson | 455/31.1 |
| 6,282,275 B1 | 8/2001 | Gurbani | |
| 6,292,479 B1 | 9/2001 | Bartholomew et al. | 370/352 |
| 6,292,549 B1 | 9/2001 | Lung et al. | |
| 6,295,502 B1 | 9/2001 | Hancock et al. | 701/201 |
| 6,301,342 B1 | 10/2001 | Ander et al. | |
| 6,301,350 B1 | 10/2001 | Henningson et al. | |
| 6,304,644 B2 | 10/2001 | Karnowski | |
| 6,310,943 B1 | 10/2001 | Kowalski | |
| 6,311,057 B1 | 10/2001 | Barvesten | |
| 6,317,488 B1 | 11/2001 | De Pond et al. | |
| 6,317,781 B1 | 11/2001 | De Boor et al. | |
| 6,324,263 B1 | 11/2001 | Sherwood et al. | 379/88.19 |
| 6,324,271 B1 | 11/2001 | Sawyer et al. | |
| 6,327,347 B1 | 12/2001 | Gutzmann | |
| 6,332,021 B2 | 12/2001 | Latter et al. | |
| 6,333,973 B1 | 12/2001 | Smith et al. | |
| 6,337,904 B1 | 1/2002 | Gisby | |
| 6,337,979 B1 | 1/2002 | Nakayasu | 455/422.1 |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,347,136 B1 | 2/2002 | Horan | |
| 6,351,637 B1 | 2/2002 | Lee | |
| 6,353,664 B1 | 3/2002 | Cannon et al. | |
| 6,361,637 B2 | 3/2002 | Martin et al. | |
| 6,363,140 B1 | 3/2002 | Pinard | |
| 6,363,411 B1 | 3/2002 | Dugan et al. | |
| 6,363,664 B1 | 4/2002 | Brutsaert | |
| 6,366,661 B1 | 4/2002 | Devillier et al. | |
| 6,366,772 B1 | 4/2002 | Arnson | |
| 6,377,807 B1 | 4/2002 | Iparrea et al. | 455/445 |
| 6,377,979 B1 | 4/2002 | Yamashita et al. | |
| 6,389,124 B1 | 5/2002 | Schnarel et al. | |
| 6,389,132 B1 | 5/2002 | Price | |
| 6,400,809 B1 | 6/2002 | Bossemeyer, Jr. et al. | 379/88.21 |
| 6,400,947 B1 | 6/2002 | Bright et al. | |
| 6,404,868 B1 | 6/2002 | Beamish et al. | |
| 6,404,875 B2 | 6/2002 | Malik et al. | |
| 6,411,692 B1 | 6/2002 | Scherer | |
| 6,421,425 B1 | 7/2002 | Bossi et al. | 379/52 |
| 6,422,263 B1 | 7/2002 | Spicer | |
| 6,427,003 B1 | 7/2002 | Corbett et al. | |
| 6,427,064 B1 | 7/2002 | Henderson | 455/31.1 |
| 6,434,394 B1 | 8/2002 | Grundvig et al. | |
| 6,437,879 B1 | 8/2002 | Temple | |
| 6,438,216 B1 | 8/2002 | Aktas | 379/88.01 |
| 6,438,217 B1 | 8/2002 | Huna | |
| 6,438,584 B1 | 8/2002 | Powers | |
| 6,442,249 B1 | 8/2002 | Miller, Jr. | |
| 6,442,262 B1 | 8/2002 | Moss et al. | |
| 6,442,263 B1 | 8/2002 | Beaton et al. | |
| 6,442,283 B1 | 8/2002 | Tewfik et al. | |
| 6,445,781 B1 | 9/2002 | Heinmiller et al. | |
| 6,449,351 B1 | 9/2002 | Moss et al. | |
| 6,449,361 B1 | 9/2002 | Okuda | 379/406.01 |
| 6,462,646 B2 | 10/2002 | Helferich | |
| 6,466,653 B1 | 10/2002 | Hamrick et al. | 379/67.1 |
| 6,477,246 B1 | 11/2002 | Dolan et al. | |
| 6,480,589 B1 | 11/2002 | Lee et al. | |
| 6,483,898 B2 | 11/2002 | Lew et al. | |
| 6,493,430 B2 | 12/2002 | Leuca et al. | |
| 6,493,431 B1 | 12/2002 | Troen-Krasnow et al. | |
| 6,493,437 B1 | 12/2002 | Olshansky | 379/114.13 |
| 6,493,439 B1 | 12/2002 | Lung et al. | |
| 6,494,953 B2 | 12/2002 | Hayes et al. | |
| 6,496,569 B2 | 12/2002 | Pelletier | |
| 6,496,571 B1 | 12/2002 | Wilson | |
| 6,496,692 B1 | 12/2002 | Shanahan | |
| 6,498,841 B2 | 12/2002 | Bull et al. | |
| 6,507,737 B1 | 1/2003 | Laham et al. | 455/423 |
| 6,529,500 B1 | 3/2003 | Pandharipande | |
| 6,529,591 B1 | 3/2003 | Dosani et al. | |
| 6,532,490 B1 | 3/2003 | Lewis et al. | |
| 6,539,080 B1 | 3/2003 | Bruce et al. | |
| 6,542,583 B1 | 4/2003 | Taylor | |
| 6,542,586 B1 | 4/2003 | Helstab | |
| 6,542,591 B1 | 4/2003 | Amro et al. | |
| 6,542,602 B1 | 4/2003 | Elazar | |
| 6,542,812 B1 | 4/2003 | Obradovich et al. | 701/207 |

| | | |
|---|---|---|
| 6,546,092 B2 | 4/2003 | Corbett |
| 6,549,621 B1 | 4/2003 | Christie, IV et al. |
| 6,553,110 B1 | 4/2003 | Peng |
| 6,553,221 B2 | 4/2003 | Nakamura |
| 6,556,540 B1 | 4/2003 | Mawhinney et al. |
| 6,560,317 B1 | 5/2003 | Quagliana |
| 6,560,327 B1 | 5/2003 | McConnell |
| 6,566,995 B2 | 5/2003 | Furuuchi et al. |
| 6,570,971 B2 | 5/2003 | Latter et al. |
| 6,570,974 B2 | 5/2003 | Gerszberg et al. |
| 6,574,319 B2 | 6/2003 | Latter et al. |
| 6,584,490 B1 | 6/2003 | Schuster et al. |
| 6,587,458 B1 | 7/2003 | Burg et al. ................ 370/356 |
| 6,590,970 B1 | 7/2003 | Cai et al. |
| 6,597,905 B1 | 7/2003 | Hijii |
| 6,603,840 B1 | 8/2003 | Fellingham et al. ...... 379/93.23 |
| 6,603,854 B1 | 8/2003 | Judkins et al. |
| 6,608,891 B1 | 8/2003 | Pelletier et al. |
| 6,618,474 B1 | 9/2003 | Reese ................ 379/142.17 |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |
| 6,661,785 B1 | 12/2003 | Zhang et al. |
| 6,665,378 B1 | 12/2003 | Spielman et al. |
| 6,665,388 B2 | 12/2003 | Bedingfield |
| 6,665,715 B1 | 12/2003 | Houri |
| 6,683,870 B1 | 1/2004 | Archer |
| 6,687,341 B1 | 2/2004 | Koch et al. ................ 379/88.17 |
| 6,697,357 B2 | 2/2004 | Emerson, III |
| 6,701,160 B1 | 3/2004 | Pinder et al. |
| 6,714,519 B2 | 3/2004 | Luzzatti et al. |
| 6,718,021 B2 | 4/2004 | Crockett et al. |
| 6,721,407 B1 | 4/2004 | Michelena |
| 6,724,872 B1 | 4/2004 | Moore et al. ............. 379/93.35 |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett |
| 6,732,188 B1 | 5/2004 | Flockhart et al. ............ 709/245 |
| 6,738,615 B1 | 5/2004 | Chow et al. |
| 6,748,058 B1 | 6/2004 | Schwend et al. |
| 6,748,068 B1 | 6/2004 | Walsh et al. |
| 6,751,457 B1 | 6/2004 | Martin ................ 455/424 |
| 6,757,274 B1 | 6/2004 | Bedingfield et al. |
| 6,757,732 B1 | 6/2004 | Sollee et al. |
| 6,757,740 B1 | 6/2004 | Parekh et al. ............. 709/245 |
| 6,760,413 B2 | 7/2004 | Cannon et al. |
| 6,765,998 B2 | 7/2004 | Bruce et al. ............. 379/88.18 |
| 6,766,003 B2 | 7/2004 | Moss et al. |
| 6,768,792 B2 | 7/2004 | Brown et al. |
| D494,953 S | 8/2004 | Leung |
| 6,771,754 B2 | 8/2004 | Pelletier et al. |
| 6,771,755 B1 | 8/2004 | Simpson |
| 6,771,956 B1 | 8/2004 | Beeler ................ 455/423 |
| 6,775,366 B1 | 8/2004 | Cobbett et al. ......... 379/201.02 |
| 6,775,540 B2 | 8/2004 | Iyer ................ 455/422.1 |
| 6,778,524 B1 | 8/2004 | Augart ................ 370/351 |
| 6,779,020 B1 | 8/2004 | Henrick ................ 709/206 |
| 6,785,301 B1 | 8/2004 | Chapman et al. |
| 6,785,368 B1 | 8/2004 | Eason et al. |
| 6,785,540 B1 | 8/2004 | Wichelman ................ 455/423 |
| 6,792,266 B1 | 9/2004 | Masuda et al. ............. 455/417 |
| 6,798,841 B2 | 9/2004 | Hansen |
| 6,798,876 B1 | 9/2004 | Bala |
| 6,798,879 B1 | 9/2004 | Beham |
| 6,807,267 B2 | 10/2004 | Moss et al. |
| 6,810,077 B1 | 10/2004 | Dezzono |
| 6,810,115 B2 | 10/2004 | Fukuda |
| 6,813,344 B1 | 11/2004 | Lemke ................ 379/142.06 |
| 6,816,481 B1 | 11/2004 | Adams et al. |
| 6,818,474 B2 | 11/2004 | Kim et al. |
| 6,826,271 B1 | 11/2004 | Kanabar et al. |
| 6,826,617 B1 | 11/2004 | Ansell et al. |
| 6,829,348 B1 | 12/2004 | Schroeder et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris ................ 379/142.01 |
| 6,853,711 B2 | 2/2005 | Brisebois et al. |
| 6,859,527 B1 | 2/2005 | Banks et al. ........... 379/106.03 |
| 6,865,266 B1 | 3/2005 | Pershan ................ 379/221.13 |
| 6,865,384 B2 | 3/2005 | Sagi et al. |
| 6,868,155 B1 | 3/2005 | Cannon et al. ......... 379/376.01 |
| 6,870,924 B1 | 3/2005 | Ukon |
| 6,888,927 B1 | 5/2005 | Cruickshank et al. |
| 6,888,972 B2 | 5/2005 | Berg et al. |
| 6,891,940 B1 | 5/2005 | Bhandari et al. |
| 6,898,275 B2 | 5/2005 | Dolan et al. ........... 379/211.02 |
| 6,904,276 B1 | 6/2005 | Freeman et al. |
| 6,907,034 B1 | 6/2005 | Begis ................ 370/354 |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones ................ 370/392 |
| 6,947,531 B1 | 9/2005 | Lewis et al. |
| 6,952,469 B2 | 10/2005 | Han ................ 379/142.17 |
| 6,977,993 B2 | 12/2005 | Starbuck et al. |
| 7,016,482 B2 | 3/2006 | Moss et al. ........... 379/142.09 |
| 7,027,408 B2 | 4/2006 | Nabkel et al. ................ 370/252 |
| 7,027,569 B2 | 4/2006 | Price |
| 7,079,837 B1 | 7/2006 | Sherman et al. |
| 7,085,578 B2 | 8/2006 | Barclay et al. |
| 7,095,715 B2 | 8/2006 | Buckman et al. |
| 7,097,169 B2 | 8/2006 | Mueller |
| 7,152,118 B2 | 12/2006 | Anderson, IV et al. |
| 7,184,533 B1 | 2/2007 | Shaffer et al. |
| 7,228,129 B1 | 6/2007 | Ward et al. |
| 7,313,227 B2 | 12/2007 | Jones |
| 2001/0002209 A1 | 5/2001 | Han |
| 2001/0005854 A1 | 6/2001 | Murata et al. ................ 709/206 |
| 2001/0044893 A1 | 11/2001 | Benussi et al. ................ 713/173 |
| 2001/0048737 A1 | 12/2001 | Goldberg et al. |
| 2002/0004382 A1 | 1/2002 | Cox et al. ................ 455/414 |
| 2002/0007400 A1 | 1/2002 | Pedersen |
| 2002/0009184 A1 | 1/2002 | Ahnier |
| 2002/0016748 A1 | 2/2002 | Emodi et al. |
| 2002/0041605 A1 | 4/2002 | Benussi et al. ................ 370/467 |
| 2002/0055926 A1 | 5/2002 | Dan et al. ................ 707/100 |
| 2002/0067816 A1 | 6/2002 | Bushnell ................ 379/201.02 |
| 2002/0077102 A1 | 6/2002 | Achuthan et al. |
| 2002/0082050 A1 | 6/2002 | Mountney et al. ........... 455/560 |
| 2002/0085687 A1 | 7/2002 | Contractor et al. |
| 2002/0090933 A1 | 7/2002 | Rouse et al. |
| 2002/0091777 A1 | 7/2002 | Schwartz |
| 2002/0094826 A1 | 7/2002 | Lee ................ 455/457 |
| 2002/0118812 A1 | 8/2002 | Contractor |
| 2002/0119430 A1 | 8/2002 | Szynalski ................ 434/219 |
| 2002/0120629 A1 | 8/2002 | Leonard ................ 707/100 |
| 2002/0122401 A1 | 9/2002 | Xiang et al. |
| 2002/0125929 A1 | 9/2002 | Chen et al. |
| 2002/0128033 A1 | 9/2002 | Burgess |
| 2002/0172338 A1 | 11/2002 | Lee et al. |
| 2002/0183098 A1 | 12/2002 | Lee et al. |
| 2002/0188443 A1 | 12/2002 | Reddy et al. |
| 2002/0191755 A1 | 12/2002 | Lew et al. |
| 2002/0196913 A1 | 12/2002 | Ruckart |
| 2002/0196914 A1 | 12/2002 | Ruckart |
| 2002/0197991 A1 | 12/2002 | Anvekar et al. |
| 2003/0002633 A1 | 1/2003 | Kredo et al. |
| 2003/0007620 A1 | 1/2003 | Elsey |

| | | |
|---|---|---|
| 2003/0012353 A1 | 1/2003 | Tang |
| 2003/0016143 A1 | 1/2003 | Ghazarian |
| 2003/0016800 A1 | 1/2003 | Fukuda |
| 2003/0021290 A1 | 1/2003 | Jones .......................... 370/466 |
| 2003/0022659 A1 | 1/2003 | Mun et al. .................. 455/415 |
| 2003/0026413 A1 | 2/2003 | Brandt et al. |
| 2003/0026416 A1 | 2/2003 | Fusco |
| 2003/0032414 A1 | 2/2003 | Melaku |
| 2003/0050100 A1 | 3/2003 | Dent ........................ 455/562 |
| 2003/0053602 A1 | 3/2003 | Stuckman et al. ............. 379/37 |
| 2003/0063730 A1 | 4/2003 | Woodring |
| 2003/0063731 A1 | 4/2003 | Woodring |
| 2003/0092384 A1 | 5/2003 | Ross |
| 2003/0095650 A1 | 5/2003 | Mize |
| 2003/0103608 A1 | 6/2003 | Pearson et al. |
| 2003/0108184 A1 | 6/2003 | Brown et al. ........... 379/265.09 |
| 2003/0112938 A1 | 6/2003 | Kanakubo et al. ...... 379/142.17 |
| 2003/0119503 A1 | 6/2003 | Shohara et al. ............. 455/434 |
| 2003/0119522 A1 | 6/2003 | Barclay et al. |
| 2003/0133553 A1 | 7/2003 | Khakoo |
| 2003/0133653 A1 | 7/2003 | Barros et al. |
| 2003/0135562 A1 | 7/2003 | Himmel et al. |
| 2003/0135626 A1 | 7/2003 | Ray et al. .................... 709/228 |
| 2003/0148758 A1 | 8/2003 | McMullin |
| 2003/0152207 A1 | 8/2003 | Ryan ..................... 379/201.04 |
| 2003/0187949 A1 | 10/2003 | Bhatt |
| 2003/0193967 A1 | 10/2003 | Fenton et al. |
| 2003/0196206 A1 | 10/2003 | Shusman ..................... 725/91 |
| 2003/0198322 A1 | 10/2003 | White, Jr. |
| 2003/0215078 A1 | 11/2003 | Brahm et al. .......... 379/211.02 |
| 2003/0219107 A1 | 11/2003 | Richardson et al. ...... 379/93.23 |
| 2004/0049545 A1 | 3/2004 | Lockridge et al. ........... 709/206 |
| 2004/0066928 A1 | 4/2004 | Leijonhufvud ........... 379/11.01 |
| 2004/0101118 A1 | 5/2004 | Powell .................... 379/142.1 |
| 2004/0101124 A1 | 5/2004 | Koch et al. |
| 2004/0109558 A1 | 6/2004 | Koch |
| 2004/0114603 A1 | 6/2004 | Suhail et al. |
| 2004/0114730 A1 | 6/2004 | Koch et al. |
| 2004/0120475 A1 | 6/2004 | Bauer et al. |
| 2004/0120478 A1 | 6/2004 | Reynolds et al. ......... 379/88.19 |
| 2004/0125929 A1 | 7/2004 | Pope |
| 2004/0171370 A1 | 9/2004 | Natarajan .................... 455/413 |
| 2004/0181587 A1 | 9/2004 | Cao et al. |
| 2004/0192332 A1 | 9/2004 | Samn ...................... 455/456.1 |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. ................ 455/415 |
| 2004/0209640 A1 | 10/2004 | Urban et al. |
| 2004/0213207 A1 | 10/2004 | Silver et al. .................. 370/352 |
| 2004/0233892 A1 | 11/2004 | Roberts et al. |
| 2004/0242212 A1 | 12/2004 | Bacon et al. |
| 2004/0248560 A1 | 12/2004 | Bedingfield et al. |
| 2005/0073999 A1 | 4/2005 | Koch ........................ 370/352 |
| 2005/0084084 A1 | 4/2005 | Cook et al. ............ 379/142.01 |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2005/0152525 A1 | 7/2005 | Kent, Jr. et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0062374 A1 | 3/2006 | Gupta |
| 2006/0152207 A1 | 7/2006 | Riebel et al. |

FOREIGN PATENT DOCUMENTS

| | | |
|---|---|---|
| KR | 2002014945 | 2/2002 |
| WO | WO 97/50225 | 12/1997 |
| WO | WO 03/030501 A1 | 4/2003 |
| WO | WO 03/030502 A1 | 4/2003 |
| WO | WO 03/090432 A1 | 10/2003 |

OTHER PUBLICATIONS

Bellcore Specification TR-NWT-000301, Calling Number Delivery, Issue 4, Dec. 1992.
Bellcore Specification TR-NWT-001188, Calling Name Delivery Generic Requirements, Issue 1, Dec. 1991.
Mark H. Norris, Transmitter Architectures, 1998, IEE, pp. 4/1-4/6.
J. Boswell et al., "An Advanced HF Receiver Design," Jul. 1994, IEE, Conference Publication No. 392, pp. 41-47.
Farley et al., "Cellular Telephone Basics: AMPS and Beyond," TelecomWrighting.com, Mar. 6, 2003, pp. 1-8.
"Time Division Multiple Access (TDMA)," International Engineering Consortium, Author Unknown, Mar. 6, 2003, pp. 1-2.
Copending U.S. Appl. No. 09/812,338 dated Mar. 19, 2001.
Copending U.S. Appl. No. 10/032,724 dated Dec. 27, 2001.
Copending U.S. Appl. No. 10/144,555 to Koch dated May 13, 2002.
Copending U.S. Appl. No. 10/144,556 dated May 13, 2002.
Copending U.S. Appl. No. 10/152,544 dated May 21, 2002.
Copending U.S. Appl. No. 10/174,026 dated Jun. 18, 2002.
Copending U.S. Appl. No. 10/200,874 dated Jul. 23, 2002.
Copending U.S. Appl. No. 10/200,906 dated Jul. 23, 2002.
Copending U.S. Appl. No. 10/201,042 dated Jul. 23, 2002.
Copending U.S. Appl. No. 10/201,706 dated Jul. 23, 2002.
Copending U.S. Appl. No. 10/702,329 to Kreiner dated Nov. 16, 2003.
Copending U.S. Appl. No. 10/746,804 to Perrella dated Dec. 24, 2003.
Copending U.S. Appl. No. 10/884,504 to Kreiner dated Jul. 2, 2004.
Copending U.S. Appl. No. 09/888,926, filed Jun. 25, 2002, entitled "Audio Caller Identification".
Copending U.S. Appl. No. 09/888,832, filed Jun. 25, 2001, entitled "Visual Caller Identification".
U.S. Official Action dated Sep. 9, 2004 cited in U.S. Appl. No. 09/888,832.
U.S. Official Action dated Dec. 28, 2004 cited in U.S. Appl. No. 09/888,926.
Mize, Gary, Patent Pend. Projected Caller ID Own 50% Look [online], Sep. 10, 2000 [retrieved on Sep. 20, 2001].
Michael W. Slawson, "Caller ID Basics", http://www.testmark.com/develop/tml_callerid_ent.html, Oct. 31, 2001, 10 pages.
"Talking Caller ID" by Stealth Software, http://www.talkingcallerid.com/, Aug. 31, 2005, 5 pages.
Aastra (quick links), http://www.aastra.com/products/callerids/voicecallerid/be-6060.html, Aug. 31, 2005, 2 pages.
Aastra (quick links), CNX Audio Conference Bridge, http://www.aastra.com/products/callerids/voicecallerid/be-9090.html, Aug. 31, 2005, 2 pages.
Smarthome, The Caller ID System That Speaks for Itself!, http://www.smarthome.com/5154.html, Aug. 31, 2005, 2 pages.
"Multi-Lingual Text-to-Speech Processor ML2110<", http://www.oki.com/semi/english/m12110/html, Aug. 31, 2005, 5 pages.
Y. Rekhter et al., "Address Allocation for Private Internets," RFC1918, Silicon Graphics, Inc., Feb. 1996, 8 pages.
K. Egevang et al., "The IP Network Address Translator (NAT)," RFC1631, NTT, May 1994, 8 pages.
M. Handley et al., "SIP: Session Initiation Protocol," RFC2543, Bell Labs, Mar. 1999, 112 pages.
Bellcore Specification TR-NWT-000310, Calling Number Delivery, Issue 4, Dec. 1992.
Bellcore Specification TR-NWT-001188, Calling Name Delivery Generic Requirements, Issue 1, Dec. 1991.
T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.
J. Boswell, G. Lingenauber, An Advanced HF Receiver Design, Jul. 1994, IEE, Conference Publication. No. 392, pp. 41-47*.
SIP: Session Initiation Protocol, Handley et al., Mar. 1999*.

Mark H. Norris, Transmitter Architectures, 1998, IEE, pp. 4/1-4/6*.

"Talking Caller ID by Stealth Software;" [online]; [retrieved on Nov. 5, 2001]; retrieved from the Internet http://www.talkingcallerid.com/.

"Time Division Multiple Access (TDMA);" [online]; [retrieved on Mar. 6, 2003]; retrieved from the Internet http://www.iec.org/online/tutorials/tdma/.

"Venture IP Telephone System" AASTRA; [online]; [retrieved on Nov. 5, 2001]; retrieved from the Internet http://www.aastra.com/products/callerids/voicecallerid/be-6090.html.

International Search Report PCT/US02/30068, Dec. 9, 2002.

International Search Report PCT/US02/29988, Sep. 23, 2002.

Partridge, H1714, Mar. 2, 1998.

CALLER IDENTIFICATION QUEUE FOR WIRELESS TELEPHONES

RELATED APPLICATIONS

The present application claims priority to U.S. application Ser. No. 09/992,165, filed on Nov. 6, 2001, and entitled CALLER IDENTIFICATION QUEUE FOR WIRELESS TELEPHONES.

FIELD OF THE INVENTION

This invention relates to a system and method for providing caller identification information to a wireless telephone for calls placed to the wireless telephone while it is out of service.

BACKGROUND OF THE INVENTION

Operational characteristics of wireless telephones and wireless telephone systems and networks differ from that of wireline systems due to the transient nature of the wireless telephones. Wireless telephones are routinely out of service for a variety of reasons. For example, if the user of a wireless telephone turns the telephone off or if the wireless telephone battery lacks sufficient charge, the wireless telephone will not be capable of receiving incoming calls. Likewise, if the wireless telephone is taken out of the wireless service area, the wireless telephone will not be capable of receiving incoming calls. During such times, the user of an out of service wireless telephone may receive voice mail messages if voice mail services are provisioned on the wireless telephone, or the user of the out of service wireless telephone may simply miss the call altogether.

Wireless telephones that are provisioned for receiving caller identification information typically display the information such as the name and telephone number of the calling party and often the date and time of the call. If the user of the wireless telephone does not answer the call, or if the user of the wireless telephone is currently speaking to another caller, the wireless telephone often will receive caller identification information on the calling party and place that information in a missed call log along with an indication that a call was missed. In either case, the calling party may be routed to the voice messaging service, if any, utilized by the wireless telephone.

A problem occurs, however, when the wireless telephone is out of service. When the wireless telephone is out of service, calls placed to the telephone may be routed through to the voice messaging service of the wireless telephone, but caller identification information is lost and no missed call log is generated for calls attempted to the wireless telephone during the out of service period. Accordingly, when the wireless telephone is returned to service, the user has no indication or record of missed calls during the out of service period.

Therefore, there is a need in the art for method and system for capturing missed call information and for delivering that information to a wireless telephone when the telephone returns to service after an out of service period.

SUMMARY OF THE INVENTION

In accordance with the present invention, the above and other problems are solved by a method and system for collecting and storing caller identification information associated with a calling party directed to an out of service wireless telephone. When calls are made to a wireless telephone, a determination is made as to whether the telephone is registered for service, that is, whether the telephone can receive calls because it is powered on and is located within a wireless telecommunications service area where it may receive calls. During out of service periods, caller identification information on calls placed to the wireless telephone is stored in an identification queue. Once the wireless telephone is registered for service, stored caller identification information is forwarded to the wireless telephone for presentation to the user of the wireless telephone. Accordingly, the user of the wireless telephone avoids missing telephone calls made to her wireless telephone during the out of service period, and the user may then return the telephone calls at a convenient time.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

The following description of an exemplary embodiment of the present invention is made with reference to the above-described drawings wherein like numerals refer to like parts or components throughout the several figures. The present invention is directed toward a method and system for collecting and storing caller identification information associated with a calling party directed to an out of service wireless telephone. Once the wireless telephone is registered for service where the wireless telephone is powered on and is located within an operational wireless telecommunications service area, stored caller identification information on calls received during the out of service period is forwarded to the wireless telephone for presentation to the user of the wireless telephone. Accordingly, the user of the wireless telephone avoids missing telephone calls made to her wireless telephone during the out of service period, and the user may then return the telephone calls at a convenient time.

Figure 1:
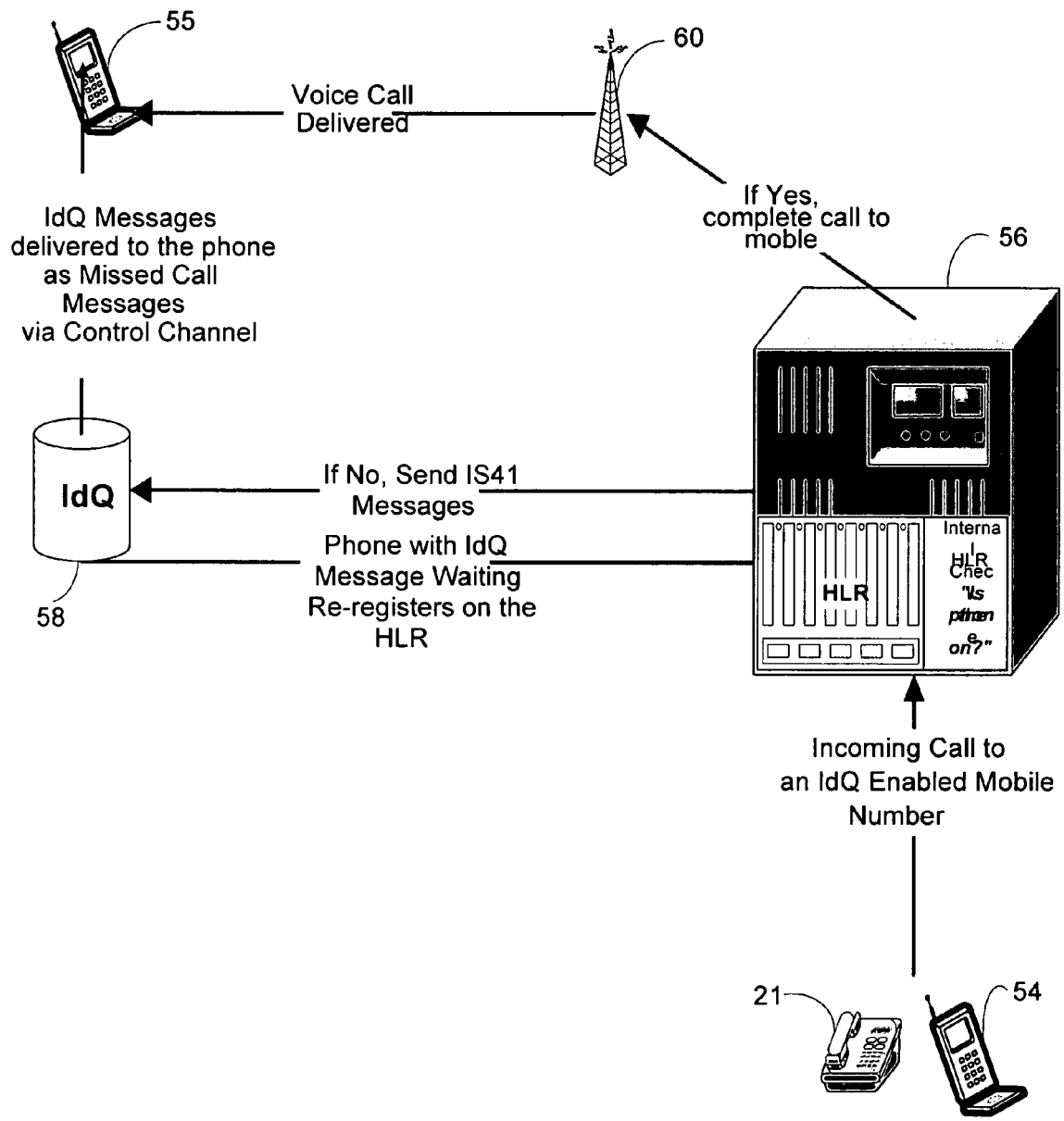
FIG. 1 is a pictorial diagram representing the system architecture of an exemplary embodiment of the present invention.

FIG. 1 is a pictorial diagram representing the system architecture of an exemplary embodiment of the present invention. When a calling party utilizing a landline telephone 21 or a wireless telephone 54 places a call to a wireless telephone 55, as illustrated in FIG. 1, a determination is made at a home location register 56 of the wireless telecommunications service provider for the wireless telephone 55 as to whether the telephone 55 is registered for service. The wireless telephone 55 is registered for service if the telephone is on and is within the service area for receiving calls. That is, if the wireless telephone is switched off, or if the telephone is off due to a dead battery or other malfunction, the home location register will register the telephone as out of service. Likewise, if the telephone has been moved to an area outside the wireless telecommunications service provider area, or if wireless signaling to the wireless telephone 55 has been temporarily interrupted or obstructed, the home location register (HLR) 56 will register the wireless telephone 55 as out of service.

If the wireless telephone 55 is registered for service, the telephone call placed to the wireless telephone 55 is routed to the wireless telephone according to well known call routing procedures in a wireless telephone communications network. An exemplary wireless telecommunications operating environment is described in detail below. It should be understood that if the wireless telephone 55 is provisioned with caller identification services, caller identification information on the calling party will be provided to the wireless telephone 55 with the call. On the other hand, if the wireless telephone 55 is registered as out of service by the HLR 56, caller identification information on the calling party is forwarded to an identification queue (IdQ) 58 for storage.

As soon as the wireless telephone 55 is returned to service, where the telephone is switched to the on position or where the wireless telephone is returned to an operational service area, signaling between the wireless telephone 55 and the HLR 56 causes the wireless telephone to be registered for service by the HLR 56. Once the wireless telephone 55 is registered for service, stored caller identification information on calls missed by the wireless telephone 55 during the out of service period are forwarded to the wireless telephone 55 for presentation to the user.

Exemplary Operating Environment

Figure 2:
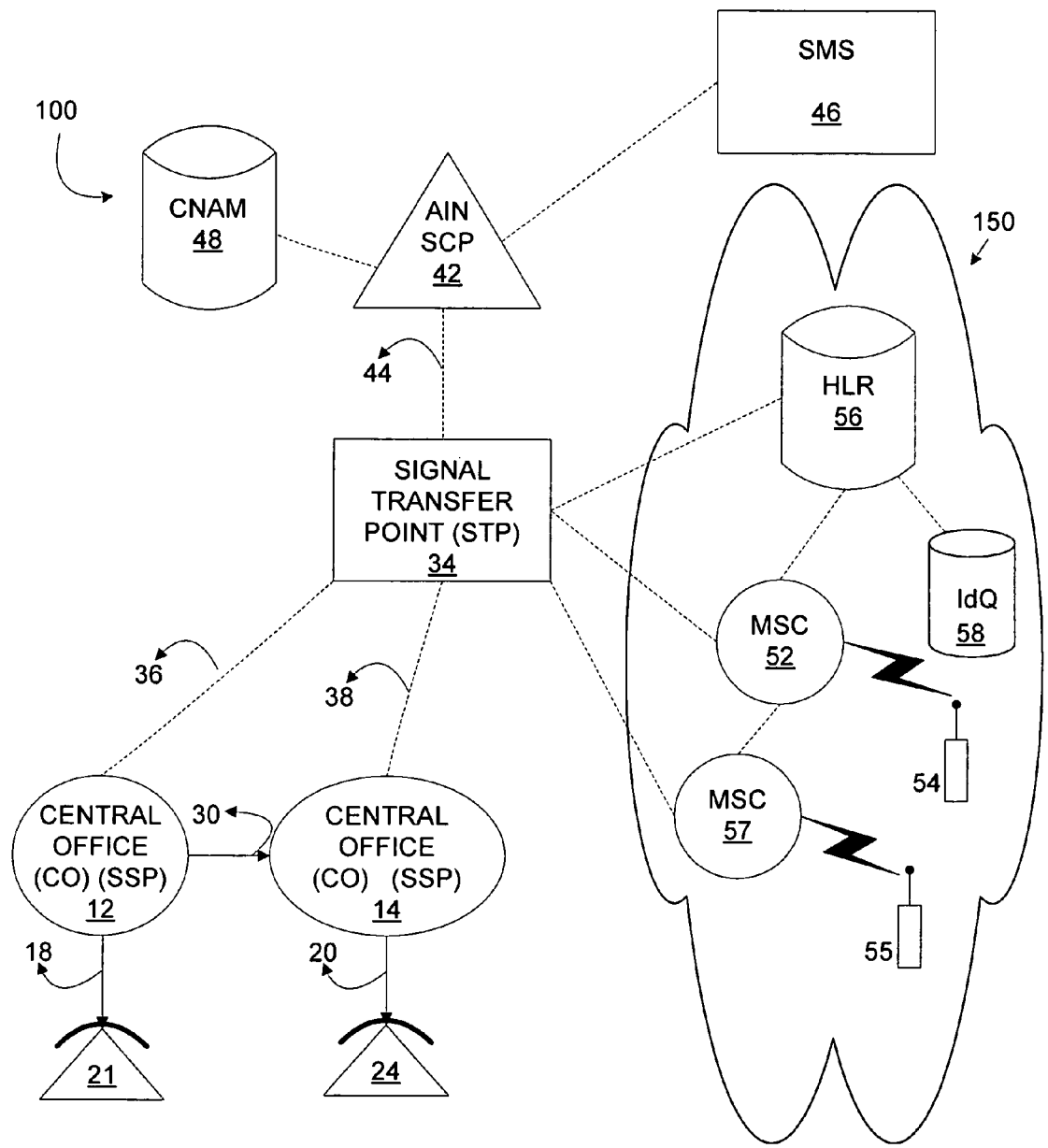
FIG. 2 is a block diagram of a telecommunications network illustrating an exemplary operating environment for the present invention.

It is advantageous to describe an exemplary operating environment in which the current invention may reside. FIG. 2 is a block diagram illustrating components of a telephone network that provides an exemplary operating environment for the present invention. Referring now to the drawings, in which like numerals represent like elements throughout the several figures, aspects of the present invention and the advanced intelligent network (AIN) and an integrated wireless network will be described.

The modern public switched telephone network (PSTN) has separate signaling paths for voice signals (or other customer-utilized communication circuits) and for control signals, which include information transmitted throughout the network to control the connection and disconnection of the voice circuits. The public switched telephone network that evolved in the 1980s incorporated the advanced intelligent network (AIN). Some of the components of the advanced intelligent network are illustrated in FIG. 2. FIG. 2 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 2, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN 10 are provided by regional STPs (not shown), regional SCPs (not shown), and a service management system (SMS) 46. The STP 34 is connected to the SSPs via connections 36, 38 and 40. Both the regional SCPs and the local SCP 42, which represent a plurality of local SCPs distributed throughout the AIN 10, are connected via respective data links to the SMS 46. The SMS 46 provides a centralized platform for remotely programming the various SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The SCP 42 is also connected to a caller name (CNAM) database 48. The CNAM database comprises a plurality of directory numbers along with associated names for the directory numbers. The CNAM database may be used to provide a look-up database to provide caller ID service. The CNAM database may comprises directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

The message created by an SSP in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well-known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 150, such as a cellular network, comprises a mobile switching center (MSC) 52. The MSC 52 is a switch providing services and coordination between wireless user in network 150 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The signaling protocol used between the components of the wireless network 150 is well known to those skilled in the art. An exemplary signaling protocol is the interim standard 41 (IS-41). The IS-41 standard defines the processed by which wireless provider accomplish signaling between the MSCs and other devices for purposes of intersystem handoff and automatic roaming. For purposes of caller identification information, as described with reference to an exemplary embodiment of the present invention, the IS-41D standard is utilized to address various features such as calling name ID, enhanced 911, and law enforcement intercept. Operation of the IS-41 signaling protocols is well known to those skilled in the art.

The MSC 52 may also be connected to a home location register (HLR) 56. The home location register 56 is a wireless telecommunications component. The HLR 56 is a permanent SS7 database used in cellular networks including the advanced mobile phone system, the global system for mobile communications and the PCS or personal communications system. The HLR 56 may be located as a separate component as illustrated in FIG. 2, or the HLR 56 may be resident on the SCP 42 of the cellular provider of record. The HLR 56 may be used to identify and verify a subscriber, including caller identification information such as name and wireless telephone number of the subscriber. The HLR 56 also contains subscriber data related to features and services subscribed to. The HLR 56 is used not only when a call is being made within an area of coverage supported by a given wireless provider, it may also be used to verify the legitimacy and features subscribed to by a given use when the user is roaming outside that area. Under roaming conditions, a local service provider may query the HLR 56 of another wireless telecommunications service provider via an SS7 data link. Once information on the subscriber is verified. Data on the subscriber may be transferred via the SS7 line to the HLR 56 of the local service provider in which the subscriber is roaming.

According to an exemplary embodiment of the present invention, the IdQ 58 or identification queue is a database used in accordance with the present invention for storage of caller identification and related information for subsequent transmission to a wireless telephone 55 after the wireless telephone is registered for service. As should be understood by those skilled in the art, the IdQ 58 may be any suitable form of electronic memory medium for storage and retrieval of caller identification and related data. The IdQ 58 is illustrated in FIG. 2 as a stand alone memory device. As should be understood by those skilled in the art, the IdQ 58 may be resident on the HLR 56, or the IdQ 58 may be resident on another telecommunications component such as the SCP 42.

Operation of an Exemplary Embodiment

Figure 3:
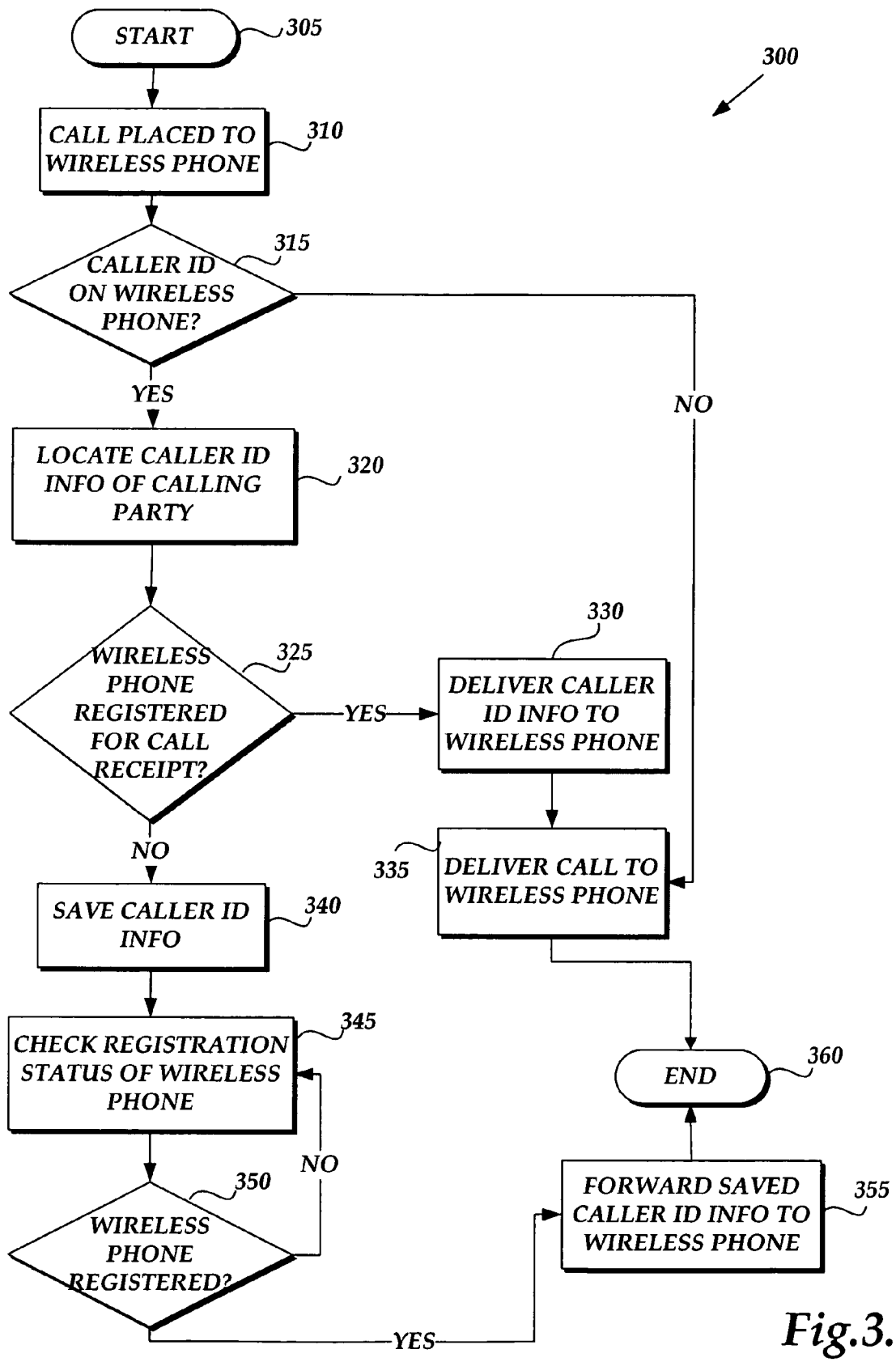
FIG. 3 is a flow diagram illustrating a method for capturing missed call information and delivering that information to a wireless telephone.

Having described an exemplary operating environment and the system architecture of the present invention with reference to FIGS. 1 and 2, FIG. 3 is a flow diagram illustrating a method for capturing missed call information and delivering that information to a wireless telephone when the wireless telephone is in service after an out of service period. The method 300 is described with reference to FIGS. 1-3, and for purposes of the exemplary call flow, assume that a wireless telephone services subscriber operates a wireless telephone 55 on which the subscriber receives caller identification information on calling parties.

The method 300 begins at step 305 and proceeds to step 310 where a call is placed to the wireless telephone 55 from a wireline telephone 21. It should be understood that the call flow described herein is equally applicable to a call initiated from a wireless telephone 54 to a wireline telephone 55. Any differences between call processing of a call directed to a wireless telephone from a wireline telephone versus a call directed to a wireless telephone from a wireless telephone are well known to those skilled in the art.

At step 315, a determination is made as to whether the wireless telephone 55 of the called party is provisioned with caller identification services. As is well known to those skilled in the art, this determination may be made at the SCP 42 by determining features applicable to the telephone line of the called party based on the digits dialed by the calling party. According to the present example, where the telephone call is made to the wireless telephone 55, the features provisioned on the wireless telephone 55 may be determined by checking the features of the wireless telephone 55 at the HLR 56.

If at step 315 a determination is made that the wireless telephone 55 is not provisioned with caller identification services, the method proceeds along the "NO" branch to step 335 and the telephone call is delivered to the wireless telephone 55, and the process ends at step 360. However, if at step 315 the determination is made that the wireless telephone 55 is provisioned with caller identification services, the method proceeds to step 320, and the caller identification information of the calling party is determined. According to an exemplary embodiment, if the calling party is calling from a wireline telephone 21, the caller identification information may be located in the CNAM 48 database through the SCP 42. If the calling party is calling from a wireless telephone 54, the caller identification information may be obtained from the CNAM 48 database or the information may be obtained from the HLR 56.

At step 325, after the caller identification information is obtained for the calling party, a determination is made as to whether the wireless telephone 55 of the called party is registered for receipt of a call. As described above, the wireless telephone 55 will be registered for receipt of a call if the telephone is on and is located within a wireless service area where calls may be routed to the wireless telephone 55. At step 325, a query may be routed from the central office 12 of the wireline telephone 21 to the SCP 42 for a determination as to whether the wireless telephone 55 of the called party is registered for service. Based on the digits dialed by the called party, the SCP 42 may transmit an IS-41 location request to the HLR 56 to obtain the registration status of the wireless telephone 55. If the call originates from a wireless telephone 54, the query for the status of the wireline telephone 55 may be directed from the MSC 52 to the HLR 56 using the IS-41 signaling protocol.

If the information contained in the HLR 56 indicates that the wireless telephone 55 is in service and ready for receipt of the call, the method proceeds along the "YES" branch to step 330, and the caller identification information is forwarded to the wireless telephone 55. At step 335, the telephone call is delivered to the wireless telephone 55. As should be understood by those skilled in the art, the user of the wireless telephone 55 may answer the telephone, not answer the telephone, or the user may be speaking with another party on the wireless telephone 55. In either case, according to an exemplary embodiment, the caller identification information will be provided to the wireless telephone 55 for presentation to the user of the wireless telephone 55 or for storage in a missed call log of the wireless telephone 55.

Returning back to step 325, if the information contained in the HLR 56 indicates that the wireless telephone 55 is not registered for service, for example, the wireless telephone 55 is turned to the off position, contains a dead battery, or is outside the service area of the wireless telephone 55, the method proceeds along the "NO" branch to step 340. At step 340, an IS-41 message containing the caller identification information for the calling party is forwarded to the IdQ 58 for storage. Caller identification information stored at the IdQ 58 is stored in the order it is received. As should be understood, a number of calls may be place to the wireless telephone during any out of service period.

At step 345, a subsequent IS-41 message is sent to the HLR 56 to determine the registration status of the wireless telephone 55. At step 350, a determination is made as to whether the wireless telephone 55 is registered for service, as described above. If the wireless telephone 55 is still out of service, the method proceeds along the "NO" branch back to step 345 at a regular frequency to check the registration status of the wireless telephone 55. It should be understood that signaling between the wireless telephone 55 and the HLR 56 continually updates the status of the wireless telephone 55. That is, when the telephone is on and in a service area in which it is registered to operate, the telephone periodically signals the HLR 56 to maintain its location and operational status updated with the HLR 56.

At step 350, if the wireless telephone 55 is now registered for service, the method proceeds along the "YES" branch to step 355. At step 355, all saved caller identification information for any calls missed by the wireless telephone 55 during the out of service period are forwarded to the wireless telephone 55. Depending on the wireless telephone model, the user may receive a missed calls message directing the user to a missed calls log where the user will find a listing of all telephone calls missed during the out of service period including the caller identification information for each of the missed calls. According to a preferred embodiment, the caller identification information is listed in the order in which calls were received. As should be understood by those skilled in the art, other information may be provided including the date and time of the missed calls. Accordingly, the user of the wireless telephone 55 may now return all missed calls directed to her wireless telephone 55 during the out of service period.

As should be understood by those skilled in the art, the foregoing call process description is applicable to situations in which the called party is roaming relative to his or her home wireless service provider area. In the case of a roaming called party, the SCP of the local service provider queries the HLR in the roaming service area via an SS7 data link. Once the legitimacy and identification of the roaming called party are determined, all information from the called party's home service area HLR 56 including caller identification information and registration status may be forwarded to the called wireless telephone 55 located in a roaming wireless telephone service area via the SS7 data links from the HLR 56 to an HLR of the roaming wireless telephone service area.

As described, a system and method are provided for capturing and delivering caller identification information for calls directed to a wireless telephone during periods in which the wireless telephone is out of service. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of capturing and delivering caller identification information to a wireless telephone for calls placed to the wireless telephone during periods in which the wireless telephone is out of service, comprising the steps of:

receiving a call from a calling party directed to the wireless telephone;

obtaining caller identification information on the calling party;

determining whether the wireless telephone is registered to receive calls;

if the wireless telephone is not registered to receive calls, storing the caller identification information;

if the wireless telephone becomes registered to receive calls, forwarding the stored caller identification information to the wireless telephone; and determining whether to forward, based on the wireless telephone model, a missed calls message directing the user to a missed calls log having caller identification information for each missed call, if the wireless telephone becomes registered to receive calls.

2. The method of claim 1, flirt her comprising the step of: after the step of forwarding the stored caller identification information to the wireless telephone, storing the caller identification information in a missed call log on the wireless telephone.

3. The method of claim 1, further comprising the step of: displaying on the wireless telephone an indication of missed calls.

4. The method of claim 1, further comprising the step of: if the wireless telephone is not registered to receive calls, checking a registration status of the wireless telephone at a regular frequency.

5. The method of claim 4, wherein the caller identification information includes the name and telephone number of the calling party.

6. The method of claim 5, wherein the caller identification information further includes the date and time of the call.

7. The method of claim 1, wherein the step of determining whether the wireless telephone is registered to receive calls includes the step of transmitting an IS-41 location request from a wireless switch to a home location register.

8. The method of claim 7, wherein the step of determining whether the wireless telephone is registered to receive calls fUrther comprises the steps of:
  determining whether the wireless telephone is powered on; and
  determining whether the wireless telephone is located in a wireless service area in which the wireless telephone may receive calls.

9. The method of claim 1, wherein the step of obtaining caller identification information on the calling party further comprises the step of: obtaining caller identification information on the calling party from a calling name database.

10. The method of claim 1, wherein the step of obtaining caller identification information on the calling party further comprises the step of: obtaining caller identification information on the calling party from a home location register.

11. The method of claim 1, wherein the step of storing the caller identification information further comprises the steps of: sending the caller identification information via an IS-41 signal message to a caller identification queue; and storing the caller identification information in the caller identification queue.

12. The method of claim 1, wherein after the step of storing the caller identification information, further comprising the step of: determining whether the wireless telephone is re-registered to receive calls.

13. The method of claim 1, wherein the step of determining whether the wireless telephone is registered to receive calls, further includes the step of: querying a home location register for information indicating that the wireless telephone is registered to receive calls.

14. A method of capturing and delivering caller identification information to a wireless telephone for calls placed to the wireless telephone during periods in which the wireless telephone is out of service, comprising the steps of:
  receiving at a wireless switch a call from a calling party directed to the wireless telephone;
  obtaining caller identification information on the calling party from a calling name database;
  querying a home location register for information indicating that the wireless telephone is registered to receive calls;
  if the wireless telephone is not registered to receive calls, sending the caller identification information to a caller identification queue for storage;
  if the wireless telephone becomes registered to receive calls, forwarding the stored caller identification information to the wireless telephone;
  storing the caller identification information in a missed call log on the wireless telephone;
  determining whether to forward, based on the wireless telephone model, a missed calls message directing the user to a missed calls log having caller identification information for each missed call, if the wireless telephone becomes registered to receive calls; and
  displaying the caller identification information on the wireless telephone.

15. The method of claim 14, wherein the step of querying a home location register for information indicating that the wireless telephone is registered to receive calls further comprises the steps of:
  determining whether the wireless telephone is powered on; and
  determining whether the wireless telephone is located in a wireless service area in which the wireless telephone may receive calls.

16. The method of claim 14, wherein prior to the step of forwarding the stored caller identification information to the wireless telephone, further comprising the step of: determining from the home location register whether the wireless telephone has become registered to receive calls.

17. A system of capturing and delivering caller identification information to a wireless telephone for calls placed to the wireless telephone during periods in which the wireless telephone is out of service, comprising:
  a wireless switch operative to receive a call from a calling party directed to the wireless telephone;
  a home location register operative:
    to obtain caller identification information on the calling party from a calling name database;
    to determine whether the wireless telephone is registered to receive calls;
    to send the caller identification information to a caller identification queue for storage, if the wireless telephone is not registered to receive calls; and
    to forward the stored caller identification information from the caller identification queue to the wireless telephone if the wireless telephone becomes registered to receive calls;
  wherein the wireless switch is operative to determine whether to forward, based on the wireless telephone model, a missed calls message directing the user to a missed calls log having caller identification information for each missed call, if the wireless telephone becomes registered to receive calls.

18. The system of claim 17, wherein the home location register is further operative to receive an IS-41 location request from a wireless switch for determining whether the wireless telephone is registered to receive calls.

19. The method of claim 17, further comprising:
  the wireless telephone operative to receive the stored caller identification information;
  to store the caller identification information in a missed call log;
  to display an indication of missed calls; and
  to display the caller identification information.

20. The system of claim 17, wherein the caller identification information includes the name and telephone number of the calling party.

* * * * *